US011387594B2

(12) United States Patent
Drmota Petric et al.

(10) Patent No.: US 11,387,594 B2
(45) Date of Patent: Jul. 12, 2022

(54) ELECTRICAL COMPONENT INCLUDING AN ELECTRICAL CABLE WITH A SEAL AND A METHOD FOR PRODUCING

(71) Applicant: KOLEKTOR GROUP D.O.O., Idrija (SI)

(72) Inventors: Ana Drmota Petric, Idrija (SI); Ludvik Kumar, Logatec (SI)

(73) Assignee: KOLEKTOR GROUP D.O.O., Idrija (SI)

( * ) Notice: Subject to any disclaimer, the term of this patent is extended or adjusted under 35 U.S.C. 154(b) by 57 days.

(21) Appl. No.: 17/099,154

(22) Filed: Nov. 16, 2020

(65) Prior Publication Data

US 2021/0075147 A1 Mar. 11, 2021

Related U.S. Application Data

(63) Continuation of application No. PCT/EP2019/062458, filed on May 15, 2019.

(30) Foreign Application Priority Data

May 16, 2018 (DE) .................... 10 2018 111 712.4

(51) Int. Cl.
*H01R 13/52* (2006.01)
*H01R 43/18* (2006.01)
*H02G 15/013* (2006.01)

(52) U.S. Cl.
CPC .......... *H01R 13/521* (2013.01); *H01R 43/18* (2013.01); *H02G 15/013* (2013.01)

(58) Field of Classification Search
CPC .. H01R 13/521; H01R 13/5845; H01R 43/18; H02G 15/013
See application file for complete search history.

(56) References Cited

U.S. PATENT DOCUMENTS 4,174,145 A * 11/1979 Oeschger .............. H01R 13/521 439/589
2013/0014987 A1* 1/2013 Hofsaess ............ H01H 37/5427 29/622
2014/0295690 A1* 10/2014 Quero pacheco .... H01R 13/521 439/271

FOREIGN PATENT DOCUMENTS

DE 102008061926 A1 6/2010
DE 102010036324 A1 1/2012
(Continued)

OTHER PUBLICATIONS

International Search Report issued for corresponding International Patent Application No. PCT/EP2019/062458 dated Jul. 22, 2019.

*Primary Examiner* — Timothy J Thompson
*Assistant Examiner* — Rhadames Alonzo Miller
(74) *Attorney, Agent, or Firm* — Myers Wolin, LLC

(57) ABSTRACT

An electrical component has an electrical cable and an electrical functional unit undetachably connected at an end side. The electrical cable has a metallic conductor and a plastic insulating sleeve surrounding the conductor. The electrical functional unit has an insulator housing injection-molded onto the plastic insulating sleeve, and an electrical functional element accommodated in the insulator housing and with which contact is made by the conductor. The plastic insulating sleeve is in a ring zone covered by the insulator housing, structured on its outer surface in an encircling manner by laser processing with a groove pattern and raised portions between the grooves. The insulator housing has a pattern formed during injection-molding by the groove pattern of the insulating sleeve, having webs which enter grooves and are anchored such that the insulator housing and insulating sleeve are permanently sealed from one another in respect of liquid media in the ring zone.

18 Claims, 3 Drawing Sheets

3,6
7
1
10
4
2
5

(56) References Cited

FOREIGN PATENT DOCUMENTS

| | | | |
|---|---|---|---|
| DE | 102011107110 | B4 | 4/2013 |
| WO | 2012107545 | A1 | 8/2012 |

* cited by examiner 3,6
7
1
10

4
2
5

8
9
4
12
10
11
11
13
5
2

ELECTRICAL COMPONENT INCLUDING AN ELECTRICAL CABLE WITH A SEAL AND A METHOD FOR PRODUCING

CROSS REFERENCE TO RELATED APPLICATIONS

This application is a continuation under 35 U.S.C. § 120 of International Application PCT/EP2019/062458, filed May 15, 2019, which claims priority to German Application No. 10 2018 111 712.4, filed May 16, 2018, the contents of each of which are incorporated by reference herein.

FIELD OF THE INVENTION

The present invention relates to an electrical component comprising at least one electrical cable and an electrical functional unit undetachably connected thereto at the end, wherein the electrical cable has at least one metallic conductor and a plastic insulating sheath surrounding the at least one conductor and the electrical functional unit comprises an isolator housing injection-molded onto the plastic insulating sheath of the cable and at least one electrical functional element received therein, contacted with the at least one conductor. Furthermore, the present invention relates to a method for the manufacture of such an electrical component.

BACKGROUND

Electrical components of the generic type indicated in the foregoing are known in diverse configurations in the prior art. In particular, they differ in terms of the respective electrical functional unit. The associated electrical functional element may be constructed, for example, as a sensor or pickup, as a switch, as a signaling or display element, as an electronic module, as a contact plug or socket or the like. DE 102011107110 B4 discloses a generic electrical component constructed as a contact plug. Additional jacketing is disposed on the plastic insulating sheath of the cable and is joined to the plastic insulating sheath by substance-to-substance bonding. The isolator housing is fabricated from plastic and joined to the additional jacketing by substance-to-substance bonding. To support the formation of the substance-to-substance bonds, it is proposed to mechanically roughen the surfaces of the plastic insulating sheath as well as of the additional jacketing by sandblasting treatment or alternatively to machine it by chemical activation.

DE 10 2011 107 110 B4 discloses an electrical component, which is equipped with a protective housing and on which two terminal faces are provided for the electrical connection of terminal cables, which are equipped with a flexible plastic jacket and are electrically connected via their first ends with the terminal faces. With their second ends, the terminal cables are led out from the protective housing through a cable bushing. Additional jacketing is disposed on the plastic jacket over a first length of the terminal cable and is joined to the plastic jacket by substance-to-substance bonding. The cable bushing is fabricated from plastic and over a second length is joined to the additional jacketing by substance-to-substance bonding.

WO 2012/107 545 A1 teaches a metal part and a method for the manufacture of a metal part. The metal part has been/is surrounded in regions by injection-overmolding with a plastic material. Along its axial extent, it has at least one embossing directed transversely relative to the axial extent.

The conditions under which generic electrical components are used may differ greatly from one another. In some cases, the electrical components are subject to special stresses and strains during operation. These include, for example, particularly high and/or low temperatures and also strong vibrations or other mechanical shaking phenomena. Furthermore, the presence of vapors and/or liquids in the environment of the electrical component may cause problems, such as, for example, hidden corrosion in the region of contacting of conductor and electrical functional element. In the case of failure of a technical device containing such a damaged electrical component, troubleshooting can be extremely complex. And in the case of technical devices that are relevant for safety, the failure attributed to such a damaged electrical component may itself conceal quite considerable risks in some situations.

SUMMARY

An object of the present invention is to provide an electrical component that is improved with respect to the problem depicted in the foregoing and to be found in the prior art.

This object is achieved according to embodiments of the invention in that, in an electrical component of generic type, the plastic insulating sheath of the cable is circumferentially structured on its outer surface, in the region of an annular zone covered by the isolator housing of the electrical functional unit, by means of laser machining in such a way that it has a groove pattern and raised regions remaining between the grooves, wherein the isolator housing has a web pattern, which is formed during injection molding thereof by the groove pattern of the insulating jacket and which corresponds thereto, and which has webs entering into the grooves and being anchored therein in such a way that the isolator housing and the plastic insulating sheath are sealed permanently relative to one another against liquid media in the annular zone. With respect to the process, and as specified in claim 17, embodiments of the present invention accordingly comprises, for the manufacture of an electrical component, a method that is characterized by the following steps: provision of at least one electrical cable having at least one metallic conductor and a plastic insulating sheath surrounding the at least one conductor; circumferentially structuring the plastic insulating sheath of the cable adjacent to one of the cable ends on its outer face in the region of an annular zone by means of laser machining in such a way that it has a groove pattern and raised regions remaining between the grooves; manufacture of an intermediate product by electrical contacting at least one electrical functional element with the end of at least one conductor of the cable; insertion, into an injection-molding die, of the intermediate product with the electrical functional element and a portion of the cable connected thereto and having the annular zone with the groove pattern on the plastic insulating sheath; manufacture of an electrical functional element joined undetachably with the cable by injection molding of an isolator housing containing the at least one electrical functional element onto the cable end, wherein, during the injection molding of the isolator housing onto this through the insulating sheath of the groove pattern of the cable, a web pattern corresponding thereto is formed that has webs entering into the grooves and being anchored there in such a way that the isolator housing and the plastic insulating sheath are permanently sealed off from one another against liquid media in the annular zone.

In application of the present invention, a risk of failure of the electrical component in question can be substantially reduced compared with the prior art by synergetic interaction, in combination with one another, of the entirety of the features characteristic of the inventive electrical components. This is so because, as is regularly the case in inventive electrical components, the fact that the raised regions remaining on the surface—between the grooves of the groove pattern manufactured by laser machining—of the plastic insulating sheath of the cable are bounded on all sides by the said grooves, favors the formation of a long-lasting highly effective sealing labyrinth even when, due to the diversity of the materials used for manufacturing the plastic insulating sheath on the one hand and for manufacturing the insulating housing on the other hand, no substance-to-substance bond can be established during injection molding of the insulating housing.

Effects related to the inventive laser structuring of the surface of the insulating sheath of the at least one electrical cable can be regarded as decisive for this. This is so because very sharp-edged grooves with extremely small corner radii can be formed by precisely that laser machining. During injection molding of the isolator housing, the plastic insulating material exposed and projecting at the sharp edges of the grooves is subjected quite particularly to the heat effect of the hot plastic melt of the isolator housing and thus is heated more strongly with a steep gradient than is the rest of the plastic insulating sheath. Thus defined rapid local melting of the plastic insulating material can occur in the region of the sharp edges of the grooves, thus acting in a manner analogous to crystallization nuclei, whereby it is possible for substance-to-substance bonds with the isolator housing material to be formed there. These zones, distributed according to the groove pattern over the circumference of the at least one cable, of substance-to-substance bonding between the insulating sheath of the at least one electrical cable and the isolator housing, are able effectively to prevent movement of these parts relative to one another. This favors permanent highly effective impermeability of the sealing labyrinth created between the grooves of the groove pattern and the webs of the web pattern injection-molded into them, without a full-surface sub stance-to-substance bond between the insulating sheath of the at least one electrical cable and the isolator housing. The latter is conducive to the reliability of the electrical component inasmuch as large-area and/or deep melting of the plastic insulation of the at least one cable can certainly be problematic, because the integrity of the plastic insulating sheath can be damaged by uncontrolled melting, which in the extreme case—especially that of multi-core cables—may lead to the risk of short circuits and fault currents. With the foregoing pattern it can also be explained why very good results can be achieved by application of the present invention even when—with respect to the specific requirements: flexible cable but hard isolator housing—the insulating sheath of the at least one electrical cable on the one hand and the isolator housing on the other hand consist of two plastics with basically different material properties.

In particular, for electrical components used in an environment containing moisture and/or other vapors (e.g. oil vapors, fuel vapors or the like), the risk of development of hidden corrosion in the region of contacting of conductors and electrical functional element is substantially reduced. The useful life and the failure safety of the technical devices available via such electrical components are enhanced. The number of complex troubleshooting activities and repair tasks is reduced.

According to a first preferred further development of the invention, grooves that extend in annularly closed manner over the circumference of the insulating sheath are provided on the circumference of the plastic insulating sheath. As an example, these annularly closed circumferential grooves may be undulating. However, even non-undulating annularly closed circumferential grooves are able to fulfill their purpose fully and completely.

A particularly further development of the invention is characterized in that the groove pattern comprises grooves crossing one another. Particularly preferably, these grooves cross one another at angles between 60° and 120°. Hereby a geometry that is particularly suitable for their function is obtained for the raised regions between the grooves. If grooves that are annularly closed and circumferential in the foregoing sense are provided, the grooves crossing them may extend in more or less axial direction of the cable, so that the grooves cross one another at angles of approximately 90°. According to another particularly preferred configuration, the grooves of the groove pattern crossing one another are formed by grooves having different screw handedness, i.e. some with left-handed and some with right-handed sense, extending helically along the surface of the plastic insulating sheath. The pitch is then preferably selected such that diamond-shaped raised regions are obtained, the extent of which is greater in circumferential direction than in axial direction. Particularly favorably, the ratios of the extent in circumferential direction to that in axial direction are between approximately 1.5 and 4, especially between 2 and 3.

According to yet another preferred further development of the invention, the depth of the grooves is between 5% and 75% of the mean thickness of the plastic insulating sheath, especially between 10% and 60%. Particularly advantageously, the depth of the grooves is between 15% and 45% of the mean thickness of the plastic insulating sheath. In this way, optimum ratios are obtained with respect to the various requirements, especially the permanently secure and impermeable interlocked anchoring of the isolator housing on the cable with continued adequate integrity of its plastic insulating sheath. In this connection, it may prove to be very favorable when—considered over the axial extent of the groove pattern—the grooves are made with different depths. In particular, the mean depth of the grooves may then increase in the direction of the closest end of the cable. In this way the notch effects—which are detrimental to the fatigue strength—in the plastic insulating sheath of the cable are reduced, without causing harm to the permanently secure and impermeable interlocked anchoring of the isolator housing on the cable.

As regards the extent of the annular zone occupied by the groove pattern, it has proved advantageous for common application situations when the axial width of the annular zone amounts to between 0.3 times and 3 times the value of the diameter of the plastic insulating sheath. It is particularly favorable when the axial width of the annular zone amounts to between 0.5 times and 2 times the value of the diameter of the plastic insulating sheath. In this case, the result of anchoring of the isolator housing on the cable in a manner that is permanently impermeable to media and also interlocking can be achieved with the least possible expenditure.

The invention can be successfully implemented in connection with a broad range of material pairs for the plastic insulating sheath on the one hand and the isolator housing of the electrical functional unit on the other hand. In particular, the plastic insulating sheath may consist of a material based on PVC, XPE, PA, FEP, ETFE, PP, PUR, TPE-E TPE-SEBS, PFA, E/VAC or derivatives thereof and the isolator housing of the electrical functional unit may consist of a thermoplastic or heat-curable material. Even with respect to the construction of the cable in other respects, no restrictions exist for application or implementation of the present invention. Thus the cable may be of single-core construction, wherein the metallic conductor is embedded directly in the plastic insulating sheath. Likewise, however, the cable may even be of multi-core construction, wherein the plastic insulating sheath surrounds several metallic conductors respectively surrounded by an individual insulating jacket. In this case, not only the plastic insulating sheath but also the insulating jackets are preferably provided additionally with a groove pattern. Accordingly, in this particularly preferred further development of the cable, at least one insulating jacket protrudes out of the plastic insulating sheath, wherein the insulating jacket in question is circumferentially structured on its outer surface, in the region of an annular zone covered by the isolator housing of the electrical functional unit, by means of laser machining in such a way that it has a groove pattern and raised regions remaining between the grooves, wherein the isolator housing has a web pattern, which is formed during injection molding thereof by the groove pattern of the insulating jacket and which corresponds thereto, and which has webs entering into the grooves and being anchored therein.

BRIEF DESCRIPTION OF THE DRAWING

The present invention will be explained in more detail hereinafter on the basis of the drawing, wherein.

DETAILED DESCRIPTION OF THE PREFERRED EMBODIMENTS

Figure 1:
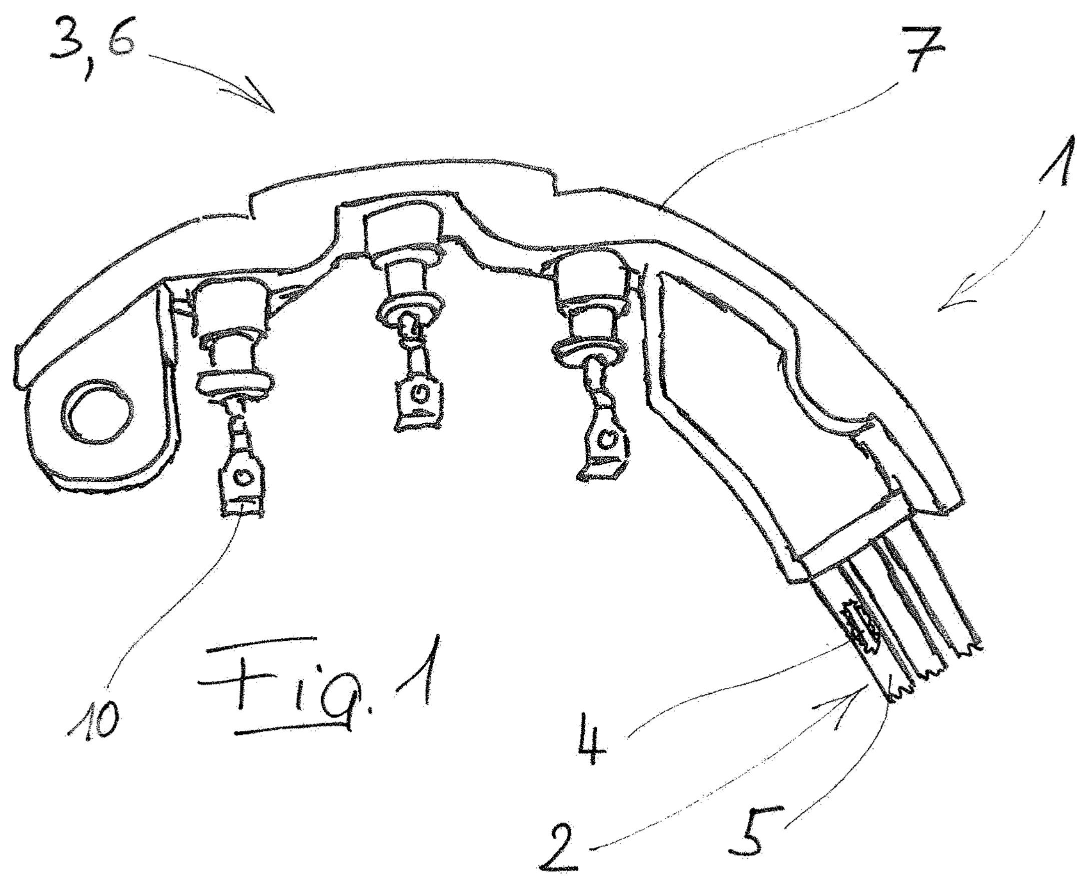
FIG. 1 shows an electrical component according to a preferred exemplary embodiment of the present invention.

Electrical component 1 shown in FIG. 1 comprises three electrical cables 2 and one electrical functional unit 3 undetachably connected thereto at the end. Each of the three (single-core) electrical cables 2 has a metallic conductor 4 and an insulating sheath 5 surrounding this. Electrical functional unit 3 constructed as an electrical terminal unit 6 comprises an isolator housing 7 and three strip-like conductive plates 8 (see FIG. 2) embedded therein and insulated from one another. These form electrical functional elements 9 and are respectively contacted electrically conductively at their one end with conductor 4 of a respectively associated cable 2. At the opposite end, conductive plates 8 respectively form a terminal lug (contact lug) 10, protruding out of isolator housing 7.

Figure 2:
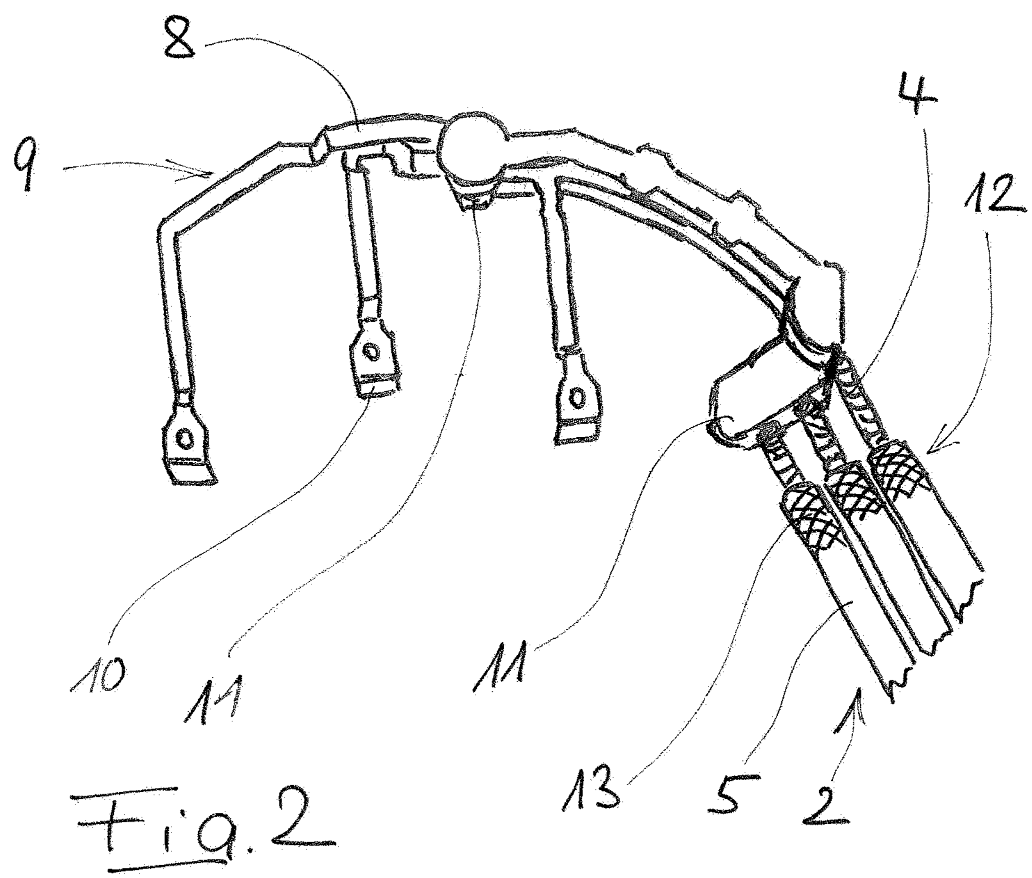
FIG. 2 shows an intermediate product used for manufacture of the electrical component according to FIG. 1.

This electrical component 1 according to FIG. 1 has been derived from the intermediate product illustrated in FIG. 2 and specifically—after insertion of the intermediate product into an appropriate injection-molding die—by injection molding of isolator housing 7. In the process, conductive plates 8 (with the exception of terminal lugs 9), together with their contacts to conductors 4 of cables 2 as well as respectively an end portion of insulating sheaths 5 of the three cables 2, are overmolded, i.e. isolator housing 7 is (also) injection-molded onto plastic insulating sheath 5 of the three cables 2. To secure the position of conductive plates 8 during the injection-molding process in question, i.e. to hold conductive plates 8 reliably spaced part from one another, conductive plates 8 of the intermediate product ("inlays") according to FIG. 2, to be inserted into the injection-molding die, are positioned relative to one another via two spacers 11, which are likewise overmolded at the same time and hereby embedded in isolator housing 7.

Figure 3:
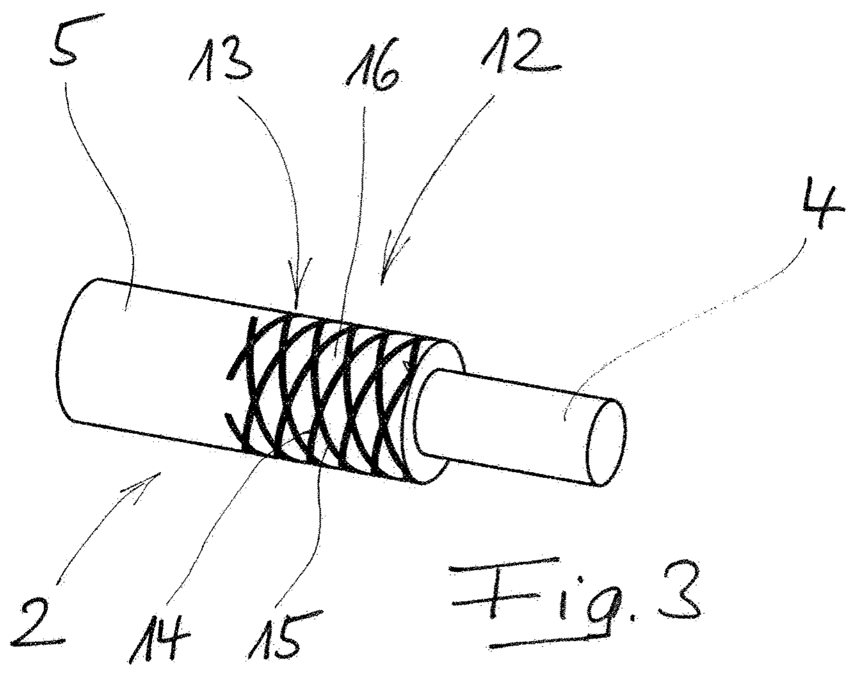
FIG. 3 shows the prepared end of one of the cables of the electrical component according to FIG. 1.

In the region of annular zone 12 respectively covered by isolator housing 7 of electrical terminal unit 6, plastic insulating sheaths 5 of the three cables 2 are circumferentially structured on their outer surface by means of laser machining, and specifically in such a way that the respective outer surface has a groove pattern 13 and raised regions 16 remaining between grooves 14, 15 (see FIG. 3). In the process, groove pattern 13 comprises grooves crossing one another with different screw handedness, in that both grooves with left-handed sense (grooves 14) and grooves with right-handed sense (grooves 15), extending helically along the surface of plastic insulating sheath 5, are provided. The pitch of the helical lines of the grooves is then selected such that, in the resulting diamond-shaped raised regions 16, the extent in circumferential direction is approximately 2.5 times greater than the extent in axial direction. The depth of these grooves 14, 15 is approximately 30% of the mean thickness of plastic insulating sheath 5. The axial extent of annular zone 12 structured by means of the groove pattern is approximately 2 times as great as the diameter of the respective cable 2.

During injection molding of isolator housing 7 (see above), three web patterns are produced thereon, formed by groove patterns 13 of the respective plastic insulating sheath 5 and corresponding thereto, and having webs entering into grooves 14, 15 and being anchored there in such a way that isolator housing 7 and plastic insulating sheaths 5 of the three cables 2 are permanently sealed against one another against liquid media in the three annular zones 12.

Figure 4:
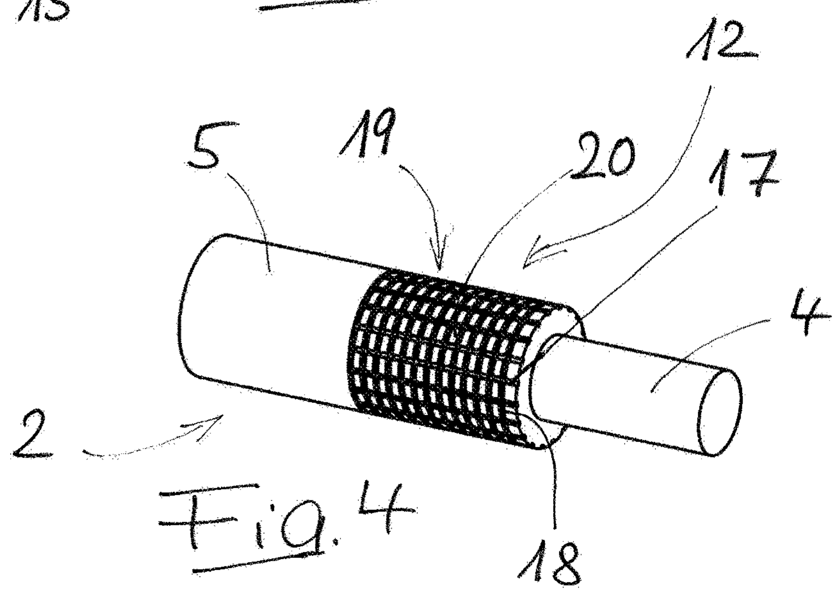
FIG. 4 shows a first modification of the cable end shown in FIG. 3.

In the embodiment illustrated in FIG. 4, grooves 17, 18, crossing one another, of groove pattern 19 are oriented differently compared with the first exemplary embodiment explained in the foregoing. On the one hand, axially extending grooves 17 and on the other hand grooves 18 extending in axial direction are provided here. The grooves of groove pattern 19 therefore cross one another at angles of 90°. And remaining raised regions 20 have a rectangular contour. Due to the spacing selected for grooves 17 and 18 relative to one another, the extent of raised regions 20 in circumferential direction is again greater than their extent in axial direction.

Figure 5:
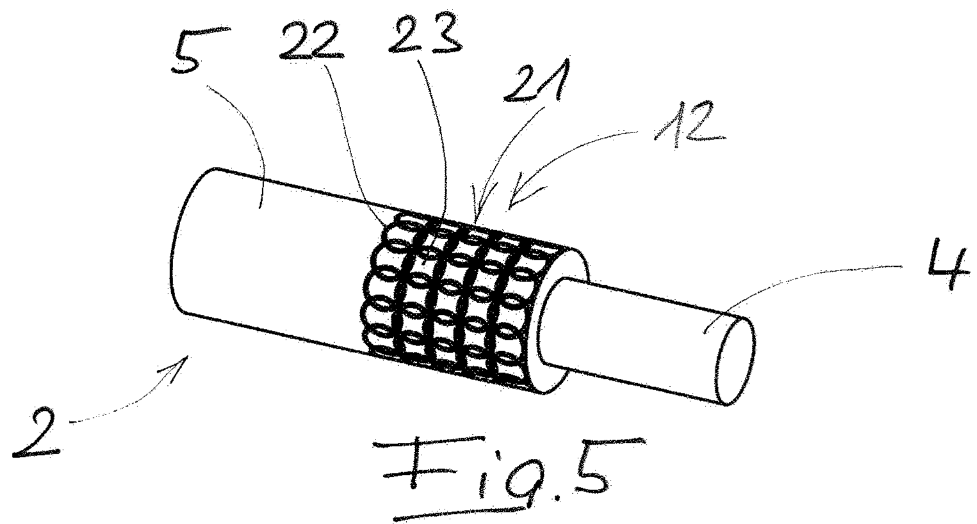
FIG. 5 shows a second modification of the cable end shown in FIG. 3.

In the embodiment illustrated in FIG. 5, groove pattern 21 machined into plastic insulating sheath 5 has a multiplicity of circularly constructed grooves 22. Circular grooves 22 in question cut or penetrate one another, whereby a corresponding pattern of upright raised regions 23 is developed.

Figure 6:
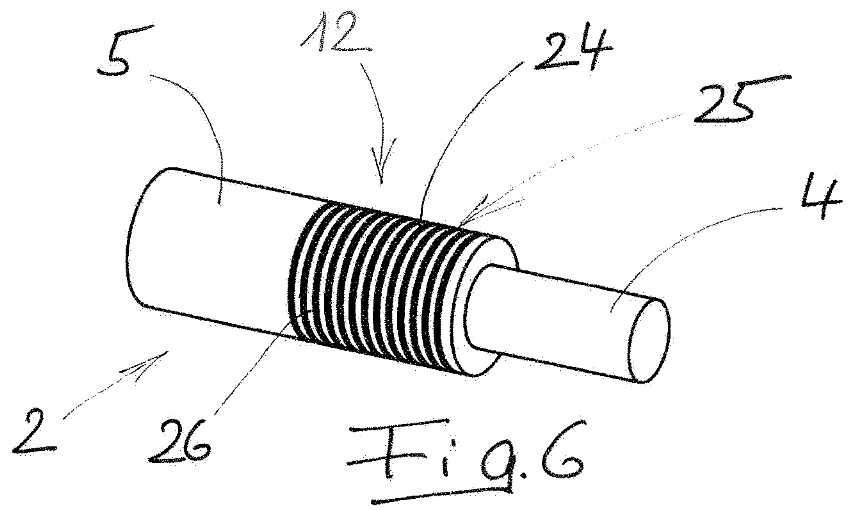
FIG. 6 shows a third modification of the cable end shown in FIG. 3.

In the embodiment illustrated in FIG. 6, grooves 24 extending parallel to one another in annularly closed manner over the circumference of plastic insulating sheath 5 are provided. Insofar, groove pattern 25 here resembles that according to FIG. 4, albeit with omission of the axially oriented grooves. Hereby raised regions 26 extending in annularly closed manner over the circumference of plastic insulating sheath 5 are formed between respectively two grooves 24 adjacent to one another.

Figure 7:
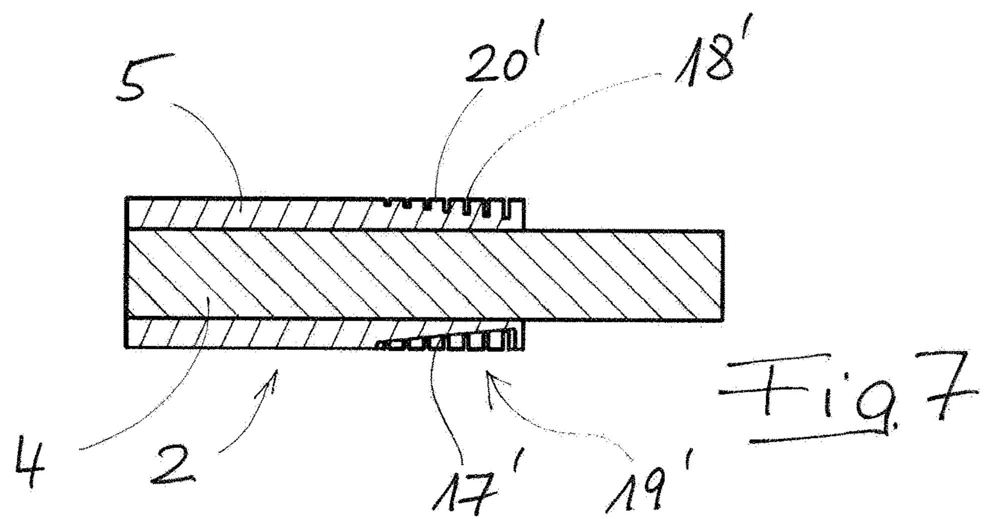
FIG. 7 shows a longitudinal section through the cable end according to a fourth modification and FIG. 8 shows the implementation of the invention on a double-insulated single-core cable.

FIG. 7 illustrates, by way of an example in connection with a groove pattern 19' resembling the embodiment according to FIG. 4, that the grooves are constructed with different depths or may have a varying depth. And, in fact, the depth of axially extending grooves 17' varies in such a way here that it increases in the direction of the closest end of cable 2. And grooves 18' extending in annularly closed manner in circumferential direction have different depths, in such a way that the depth increase in the direction of the closest end of cable 2 from annular groove 17' to annular groove 18'. Accordingly, the relative height of raised regions 20'—bounded by grooves 17' and 18'—(also) increases in the direction of the closest end of cable 2. Comparable groove patterns can be realized with grooves of any desired different geometry, for example for the further groove patterns illustrated in the other figures of the drawing.

Figure 8:
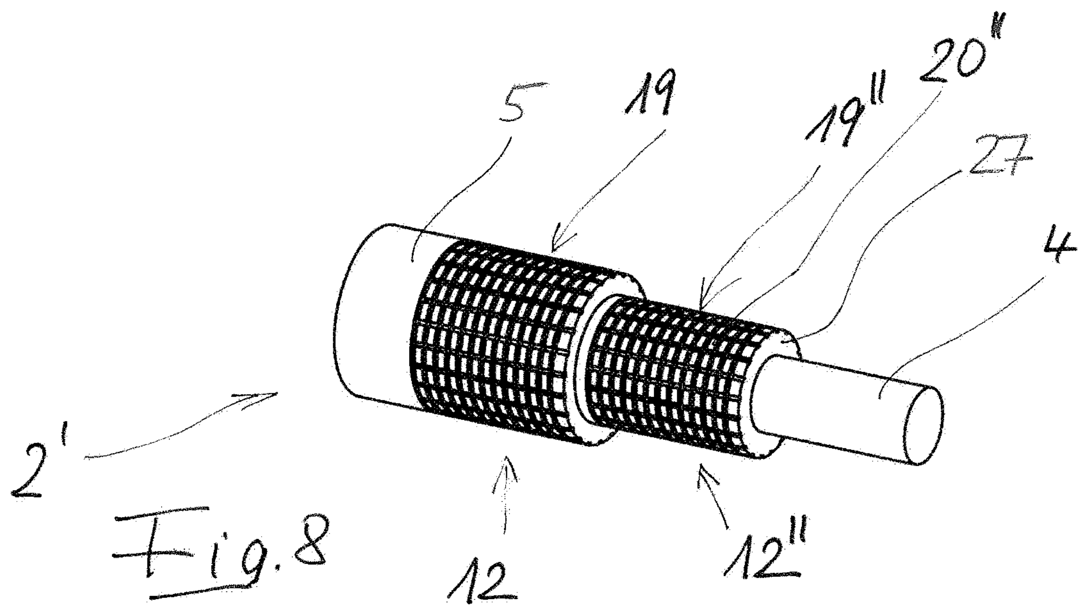

FIG. 8 shows, by way of example on the basis of a groove pattern analogous to that of FIG. 4, a preferred implementation of the present invention for a cable 2' having double insulation. And specifically, preferably both (outer) plastic insulating sheath 5 and (inner) insulating jacket (top coat) 27 are respectively structured here with a groove pattern 19, 19" manufactured by means of laser machining. And the isolator housing to be injection-molded onto cable 2' covers not only—in a corresponding annular zone 12—plastic insulating sheath 5, but to the contrary, in a further annular zone 12", also insulating jacket 27 protruding out of this; in other words, the isolator housing is therefore injection-molded onto both plastic insulating sheath 5 and onto insulating jacket 27, thus forming a double seal. Groove pattern 19" of this insulating jacket 27 may, as shown, correspond in the geometric respect to that of plastic insulating sheath 5. However, this is in no case absolutely necessary; to the contrary, individual adaptation of the two groove patterns to the respective specific stresses and strains—while also allowing for the respective material pair—is possible and practical.

The procedure for use of a multi-core cable will expediently correspond to the exemplary embodiment according to FIG. 8. In this case, therefore, in addition to the plastic insulating sheath that is common for all strands, the individual insulating jackets assigned to the individual strands and protruding therefrom are preferably respectively structured circumferentially on their outer surface, in the region of an annular zone covered by the isolator housing of the electrical functional unit, by means of laser machining in such a way that they have a grooved pattern and raised regions remaining between the grooves, wherein the isolator housing has a web pattern, which is formed during injection molding thereof by the groove pattern of the insulating jacket and which corresponds thereto, and which has webs entering into the grooves and being anchored therein. However, as a consequence of the easier manufacturability and higher reliability of electrical components in which the electrical functional unit is to be connected to several conductors, the construction illustrated in FIGS. 1 and 2, with several single-core cables (having multiple insulation if necessary), is to be preferred to the use of a multi-core cable.

What is claimed is:

1. An electrical component comprising at least one electrical cable and an electrical functional unit undetachably connected thereto at the end, wherein the electrical cable has at least one metallic conductor and a plastic insulating sheath surrounding the at least one conductor and the electrical functional unit comprises an isolator housing injection-molded onto the plastic insulating sheath of the cable and at least one electrical functional element received therein, contacted with the at least one conductor, wherein the plastic insulating sheath of the cable in the region of an annular zone covered by the isolator housing of the electrical functional unit is circumferentially structured on its outer surface, by means of laser machining in such a way that it has a groove pattern and raised regions remaining between the grooves, wherein the isolator housing has a web pattern, which is formed during injection molding thereof by the groove pattern of the insulating jacket and which corresponds thereto, and which has webs entering into the grooves and being anchored therein in such a way that the isolator housing and the plastic insulating sheath are sealed permanently relative to one another against liquid media in the annular zone.

2. The electrical component of claim 1, wherein grooves extending in annularly closed manner over the circumference of the insulating sheath are provided.

3. The electrical component of claim 1, wherein grooves crossing one another are provided.

4. The electrical component of claim 3, wherein the grooves cross one another at angles between 60° and 120°.

5. The electrical component of claim 1, wherein the depth of the grooves amounts to between 5% and 75% of the mean thickness of the plastic insulating sheath.

6. The electrical component of claim 5, wherein the depth of the grooves amounts to between 10% and 60% of the mean thickness of the plastic insulating sheath.

7. The electrical component of claim 6, wherein the depth of the grooves amounts to between 15% and 45% of the mean thickness of the plastic insulating sheath.

8. The electrical component of claim 1, wherein the grooves are constructed with different depths.

9. The electrical component of claim 8, wherein the mean depth of the grooves increases in the direction of the closest end of the cable.

10. The electrical component of claim 1, wherein the axial width of the annular zone amounts to between 0.3 times and 3 times the value of the diameter of the plastic insulating sheath.

11. The electrical component of claim 10, wherein the axial width of the annular zone amounts to between 0.5 times and 2 times the value of the diameter of the plastic insulating sheath.

12. The electrical component of claim 1, wherein the plastic insulating sheath consists of a material based on PVC, XPE, PA, FEP, ETFE, PP, PUR, TPE-E TPE- SEBS, PFA, E/VAC or derivatives thereof.

13. The electrical component of claim 1, wherein the isolator housing of the electrical functional unit consists of a thermoplastic or a heat-curable material.

14. The electrical component of claim 1, wherein the cable is of single-core construction.

15. The electrical component of claim 1, wherein the cable has double insulation, wherein an insulation closest to the conductor is formed by an insulating jacket surrounded by the plastic insulating sheath, and the isolator housing of the electrical functional unit is additionally injection-molded onto a portion of the insulating jacket protruding out of the plastic insulating sheath, wherein the insulating jacket is structured all around on its outer surface, in the region of an annular zone covered by the isolator housing of the electrical functional unit, by means of laser machining in such a way that it has a groove pattern and raised regions remaining between the grooves, wherein the isolator housing has a web pattern, which is formed during injection molding thereof by the groove pattern of the insulating jacket and which corresponds thereto, and which has webs entering into the grooves and being anchored therein.

16. The electrical component of claim 1, wherein the cable is of multi-core construction, wherein the plastic insulating sheath surrounds several metallic conductors respectively surrounded by an individual insulating jacket.

17. The electrical component of claim 16, wherein at least one insulating jacket protrudes out of the plastic insulating sheath, wherein the insulating jacket in question is circumferentially structured on its outer surface, in the region of an annular zone covered by the isolator housing of the electrical functional unit, by means of laser machining in such a way that it has a groove pattern and raised regions remaining between the grooves, wherein the isolator housing has a web pattern, which is formed during injection molding thereof by the groove pattern of the insulating jacket and which corresponds thereto, and which has webs entering into the grooves and being anchored therein.

18. A method for manufacturing an electrical component, the method comprising:

provision of at least one electrical cable having at least one metallic conductor and a plastic insulating sheath surrounding the at least one conductor;

circumferentially structuring the plastic insulating sheath of the cable adjacent to one of the cable ends on its outer face in the region of an annular zone by means of laser machining in such a way that it has a groove pattern and raised regions remaining between the grooves;

manufacture of an intermediate product by electrical contacting at least one electrical functional element with the end of at least one conductor of the cable;

insertion, into an injection molding die, of the intermediate product with the electrical functional element and a portion of the cable connected thereto and having the annular zone with the groove pattern on the plastic insulating sheath;

manufacture of an electrical functional unit joined undetachably with the cable by injection molding of an isolator housing containing the at least one electrical functional element onto the cable end, wherein, during the injection molding of the isolator housing onto this through the groove pattern of the insulating sheath of the cable, a web pattern corresponding thereto is formed that has webs entering into the grooves and being anchored there in such a way that the isolator housing and the plastic insulating sheath are permanently sealed off from one another against liquid media in the annular zone.

* * * * *